Patented July 5, 1949

2,475,034

UNITED STATES PATENT OFFICE 2,475,034

POLYAMIDE-ESTER COMPOSITION

Edward A. Lasher, Los Angeles, Calif., assignor to California Flaxseed Products Company, Los Angeles, Calif., a corporation of California No Drawing. Application November 7, 1944, Serial No. 562,386

1 Claim. (Cl. 260—75)

This invention relates to a polyamide-ester resin composition having high flexibility, and particularly one adapted for use at extremes of atmospheric temperatures.

The object of the invention is to provide a resinous material for use as a coating or binder which maintains flexibility at the lowest and highest atmospheric temperatures encountered in aviation. Another object is to provide a material which is quite insoluble in aromatic-containing hydrocarbon solvents. Still another object is to provide a semi-solid sealing compound adapted for use under extreme atmospheric temperature conditions.

I have discovered that the interesterification and polymerization of a diamine of the type having the formula NH₂—R'—NH₂, R' representing a saturated divalent aliphatic hydrocarbon radicle of six to ten carbon atoms inclusive, an acid of the general formula HOOC—R—COOH, in which R is a saturated divalent aliphatic hydrocarbon radicle of four to eight carbon atoms, inclusive, polyethylene glycols including di-, tri-, and tetra- ethylene glycols, and glycerol produces a semi-solid resin which maintains its semi-solid state over a wide range of atmospheric temperatures, and which is highly insoluble in aromatic hydrocarbon solvents. The amounts of the constituents may be varied to some extent with resulting variation in the properties, as will be described.

In general, I use in my new resins proportions of the ingredients so that the number of equivalents of dibasic acid will be about ten percent less than the combined number of equivalents of the glycerine, polyethylene glycols and diamine, with the ratio of the polyethylene glycol to glycerol being about 3 or 4 to one, and the diamine content being in the range of about 1 to 17 parts by weight of the diamine to 100 parts by weight of the other ingredients.

I prefer to use hexamethylene diamine, adipic acid, diethylene glycol and glycerol.

Example I

As one example of my composition, I have heated together

| | Parts by weight |
|---|---|
| Adipic acid | 478 |
| Hexamethylene diamine | 58 |
| Diethylene glycol | 252 |
| Glycerol | 44 | using a closed container and a condenser to avoid loss of volatile material. The batch was brought to 450° F. in two hours and held at 450 to 465° F. for four hours. This produced a stiff, semi-solid material having an acid number of 17.4. When spread in a thin film, by melting, and repeatedly flexed, the film remains flexible for a long time, but eventually tears.

Example II

By reducing the hexamethylene diamine to one-half that of Example I, and also adjusting the adipic acid content by an equivalent amount, a more flexible material is formed by heating at a temperature of 460° F. for about 6½ hours. The acid number was 15.2. The ingredients were used in the following proportions:

| | Parts by weight |
|---|---|
| Adipic acid | 441 |
| Hexamethylene diamine | 29 |
| Diethylene glycol | 252 |
| Glycerol | 44 |

The product was a clear, stiff, semi-solid, which in thin film could be flexed sharply without tearing.

Example III

Ethylene diamine was substituted for the hexamethylene diamine in the composition of Example II, using an equivalent quantity, and this gave a similar product except that it was slightly more sticky.

Hexamethylenediamine and adipic acid are known to form hexamethylene adipamide when the ingredients are brought together under suitable conditions, and in an autoclave the hexamethylene adipamide may be polymerized into molecules up to 10,000 or more units. The polymerized hexamethylene adipamide is suitable for use in my composition, since under the conditions of forming my composition, the polymerized molecules yield, by de-polymerization, effective amounts of the hexamethylene diamine to give, with the other ingredients which I use, the new compositions of this invention. The commercially available polyamide material nylon, which is substantially polyhexamethylene adipamide, may be used in my compositions in place of the separate ingredients hexamethylene diamine and a part of the adipic acid, although approximately twice as much of the nylon is required to give the same properties compared with the products made by using in the original mixture before heating, the uncombined hexamethylene diamine. It is believed that in the heating necessary to produce my compound that the polymerized hexamethylene adipamide is to some extent de-polymerized and then reacts as would the separate ingredients.

Example IV

Illustrating the use of the already polymerized hexamethylene adipamide (nylon) as a separate ingredient in my composition, I have made the following:

| | Parts by weight |
|---|---|
| Adipic acid | 102 |
| Diethylene glycol | 63 |
| Glycerol | 11 |
| Poly-hexamethylene adipamide (nylon #6) | 25 |

This mixture was heated for two hours to a temperature of 460° F. which dissolved the polyamide flakes, and the melt was kept at this temperature for four more hours. The acid number of the product was 19.8. This product is semi-solid, somewhat "horny" does not flow at room temperature, and is still flexible to −50° C. It is not soluble in boiling benzene, nor in acetone, ethyl acetate, or lacquer solvent, but is soluble in a mixture of equal parts of acetone and ethyl alcohol.

Example V

On increasing the poly-hexamethylene adipamide to 50 parts in the composition of Example IV, and heating the mixture in the same way, the product has very similar properties, but is somewhat less flexible, and tears more easily on repeated flexing in thin sheets.

Example VI

Another illustrative composition was made as follows:

| | Parts by weight |
|---|---|
| Adipic acid | 571 |
| Diethylene glycol | 352 |
| Glycerol | 63 |
| Polyhexamethylene adipamide (nylon #6) | 30 |

This mixture was heated to 500° F. in about two hours and held at 500° F. for an additonal 2¼ hours or until a test portion, when put on a cold metal plate, first shows "snap-back" or elasticity when pulled out with the fingers as soon as it is cool enough to handle. The acid number of the product was 14.0. It is a clear, semi-solid, gel-like resin which is insoluble in an aromatic-containing hydrocarbon solvent (60% aviation gasoline; 20% toluene; 15% xylene; 5% benzene).

Example VII

Illustrating the use of other saturated aliphatic dicarboxylic acids in which the divalent radicle is in the range from 4 to 8 carbon atoms, I have used the following:

| | Parts by weight |
|---|---|
| Azelaic acid | 380 |
| Diethylene glycol | 186 |
| Glycerol | 31 |
| Poly-hexamethylene adipamide | 60 |

This mixture was heated, with refluxing and stirring, to 500° F. in two hours and held at 500° F. for 2½ hours. The acid number was 6.2, and the product was similar to that of Example IV but somewhat softer and more rubbery. It is not soluble in aromatic-containing hydrocarbon solvent (60% aviation gasoline; 20% toluene; 15% xylene; 5% benzene).

I have found that it is necessary to heat all of the ingredients together to produce the homogeneous semi-solid material of my invention. When the dibasic acid and the glycerol and polyethylene glycol ingredient are heated, they form a resinous product, but if it is attempted to then add the hexamethylene or other diamine compound, the two materials are not compatible, and the mixture does not become homogeneous even by prolonged heating. This is particularly true when the highly polymerized hexamethylene adipamide (nylon) is used.

The proportion of glycerol to polyethylene glycol effects the gel strength of the product. If no glycerol is used in the composition, the product is of cheesy consistency and non-elastic. I prefer to use polyethylene glycol in the ratio of from three to four equivalents to one equivalent of glycerol to get the semi-solid consistency in a wide range of temperature.

In order to keep the acid number of the product low, I prefer to use about ten percent less than the equivalent proportion of the acid, including the acid which reacts with the diamine. In some uses of my semi-solid product, acid-sensitive pigments such as zinc chromate (as a metal corrosion inhibitor) are incorporated, and where this condition exists, the low acid number and low proportion of acid is especially desirable.

The lower polyethylene glycols, in general, may be used in my composition, and the diethylene glycol is specifically used in the illustrative compositions because it is readily available commercially, and as representative of the lower polyethylene glycols. The di-, tri- or tetra-ethylene glycols, or mixtures of them, may be used, making suitable adjustments of the weights and proportions to compensate for the molecular weights. The term "lower polyethylene glycols" as used herein means diethylene glycol, triethylene glycol, tetra-ethylene glycol, and mixtures of polyethylene glycols containing one or more of these members in substantial amounts.

My composition is characterized by its unusually low solubility in aviation gasoline, and in mixtures of aromatic and aliphatic hydrocarbon solvents; by its maintaining a semi-solid condition over a wide range of atmospheric temperatures, remaining flexible at temperatures as low as −40° F. and being semi-solid and non-flowing at temperatures as high as 170° F.; and by stability over long periods of time.

My compositions have been used advantageously alone and with other ingredients, in coating metal and other containers for aviation gasoline, for lining explosives containers, for binding propulsion charges, and for other purposes.

I claim:

A resin comprising an interesterification and copolymerization product of adipic acid, diethylene glycol, glycerol, and hexamethylene diamine, the number of equivalents of adipic acid being about ten percent less than the combined number of equivalents of the hydroxyl compounds and the diamine, the ratio of the equivalents of diethylene glycol to equivalents of glycerol being in the range from 3 to 4, and the hexamethylene diamine content of the ingredient mixture being in the range from 1 to 17 parts by weight of diamine to 100 parts by weight of the other ingredients.

EDWARD A. LASHER.

REFERENCES CITED

The following references are of record in the file of this patent:

UNITED STATES PATENTS

| Number | Name | Date |
|---|---|---|
| 2,048,778 | Brubaker et al. | July 28, 1936 |